US006008825A

United States Patent [19]

Fassler et al.

[11] Patent Number: 6,008,825

[45] Date of Patent: Dec. 28, 1999

[54] MICROFLUIDIC PRINTING INDEPENDENT OF ORIENTATION

[75] Inventors: Werner Fassler; Xin Wen, both of Rochester; Charles D. DeBoer, Palmyra, all of N.Y.

[73] Assignee: Eastman Kodak Company, Rochester, N.Y.

[21] Appl. No.: 08/919,057

[22] Filed: Aug. 27, 1997

[51] Int. Cl.[6] .................... G01D 15/18

[52] U.S. Cl. .................... 346/140.1

[58] Field of Search .................... 346/140.1; 347/6, 347/7, 14

[56] References Cited

U.S. PATENT DOCUMENTS

| | | |
|---|---|---|
| 5,585,069 | 12/1996 | Zanzucchi et al. . |
| 5,593,838 | 1/1997 | Zanzucchi et al. . |
| 5,603,351 | 2/1997 | Cherukuri et al. . |
| 5,611,847 | 3/1997 | Guistina et al. . |

OTHER PUBLICATIONS

Dasgupta et al., see "Electroosmosis: A Reliable Fluid Propulsion System for Flow Injection Analyses", Anal. Chem. 66, pp. 1792–1798 (1994).

*Primary Examiner*—N. Le
*Assistant Examiner*—Lamson D. Nguyen
*Attorney, Agent, or Firm*—Raymond L. Owens

[57] ABSTRACT

A microfluidic printing apparatus includes at least one ink reservoir; a structure defining a plurality of chambers arranged so that the chambers form an array with each chamber being arranged to form an ink pixel; a plurality of microchannels connecting the reservoir to a chamber; and a plurality of microfluidic pumps each being associated with a single microchannel for supplying ink from an ink reservoir through a microchannel for delivery to a particular chamber. The printing apparatus provides an electrical signal representing the orientation of the printing apparatus; and control circuit responsive to the electrical signal and for controlling the microfluidic pumps for causing an array of pixels to be printed when the microfluidic pumps supply ink through the microchannels to the chambers so that the correct amount of ink is delivered into each chamber.

3 Claims, 7 Drawing Sheets

MICROFLUIDIC PRINTING INDEPENDENT OF ORIENTATION

CROSS REFERENCE TO RELATED APPLICATIONS

The present invention is related to U.S. patent application Ser. No. 08/868,426 filed Jun. 3, 1997, entitled "Continuous Tone Microfluidic Printing" to DeBoer, Fassler, and Wen; U.S. patent application Ser. No. 08/868,416 filed Jun. 3, 1997 entitled "Microfluidic Printing on Receiver", to DeBoer, Fassler, and Wen; U.S. patent application Ser. No. 08/868,102 filed Jun. 3, 1997 entitled "Microfluidic Printing with Ink Volume Control" to Wen, DeBoer, and Fassler; U.S. patent application Ser. No. 08/868,477 filed Jun. 3, 1997 entitled "Microfluidic Printing with Ink Flow Regulation" to Wen, Fassler, and DeBoer, all assigned to the assignee of the present invention. The disclosure of these related applications is incorporated herein by reference.

FIELD OF THE INVENTION

The present invention relates to printing high quality images by microfluidic pumping of colored inks onto a receiver.

BACKGROUND OF THE INVENTION

Microfluidic pumping and dispensing of liquid chemical reagents is the subject of three U.S. Pat. Nos. 5,585,069, 5,593,838, and 5,603,351, all assigned to the David Sarnoff Research Center, Inc. The system uses an array of micron sized reservoirs, with connecting microchannels and reaction cells etched into a substrate. Microfluidic pumps comprising electrically activated electrodes within the capillary microchannels provide the propulsive forces to move the liquid reagents within the system. The microfluidic pump, which is also known as an electroosmotic pump, has been disclosed by Dasgupta et al., see "Electroosmosis: A Reliable Fluid Propulsion System for Flow Injection Analyses", Anal. Chem. 66, pp 1792–1798 (1994). The chemical reagent solutions are pumped from a reservoir, mixed in controlled amounts, and them pumped into a bottom array of reaction cells. The array may be decoupled from the assembly and removed for incubation or analysis. When used as a printing device, the chemical reagent solutions are replaced by dispersions of cyan, magenta, and yellow pigment, and the array of reaction cells may be considered a viewable display of picture elements, or pixels, comprising mixtures of pigments having the hue of the pixel in the original scene. When contacted with paper, the capillary force of the paper fibers pulls the dye from the cells and holds it in the paper, thus producing a paper print, or photograph, of the original scene. One problem with this kind of printer is the control of the liquid inks. If the printer is held upside down, gravitational forces may cause the inks to flow and bleed together, destroying the integrity of the printed image. If the printer is moved during the printing operation, acceleration forces may make one side of the printed image darker than the other.

SUMMARY OF THE INVENTION

It is an object of the present invention to provide a compact, low powered printer which could rapidly print a high quality image without artifacts caused by changes in the printer position or orientation or acceleration.

These objects are achieved by a microfluidic printing apparatus comprising:

a) at least one ink reservoir;

b) a structure defining a plurality of chambers arranged so that the chambers form an array with each chamber being arranged to form an ink pixel;

c) a plurality of microchannels connecting the reservoir to a chamber;

d) a plurality of microfluidic pumps each being associated with a single microchannel for supplying ink from an ink reservoir through a microchannel for delivery to a particular chamber;

e) means for providing an electrical signal representing the orientation of the printing apparatus; and f) control means responsive to the electrical signal and for controlling the microfluidic pumps for causing an array of pixels to be printed when the microfluidic pumps supply ink through the microchannels to the chambers so that the correct amount of ink is delivered into each chamber.

ADVANTAGES

An advantage of the present invention is the provision of high quality ink images, regardless of changes in microfluidic printing apparatus position or orientation.

DETAILED DESCRIPTION OF THE INVENTION

The present invention is described in relation to a microfluidic printing apparatus which can print computer generated images, graphic images, line art, text images and the like, as well as continuous tone images.

Figure 1:
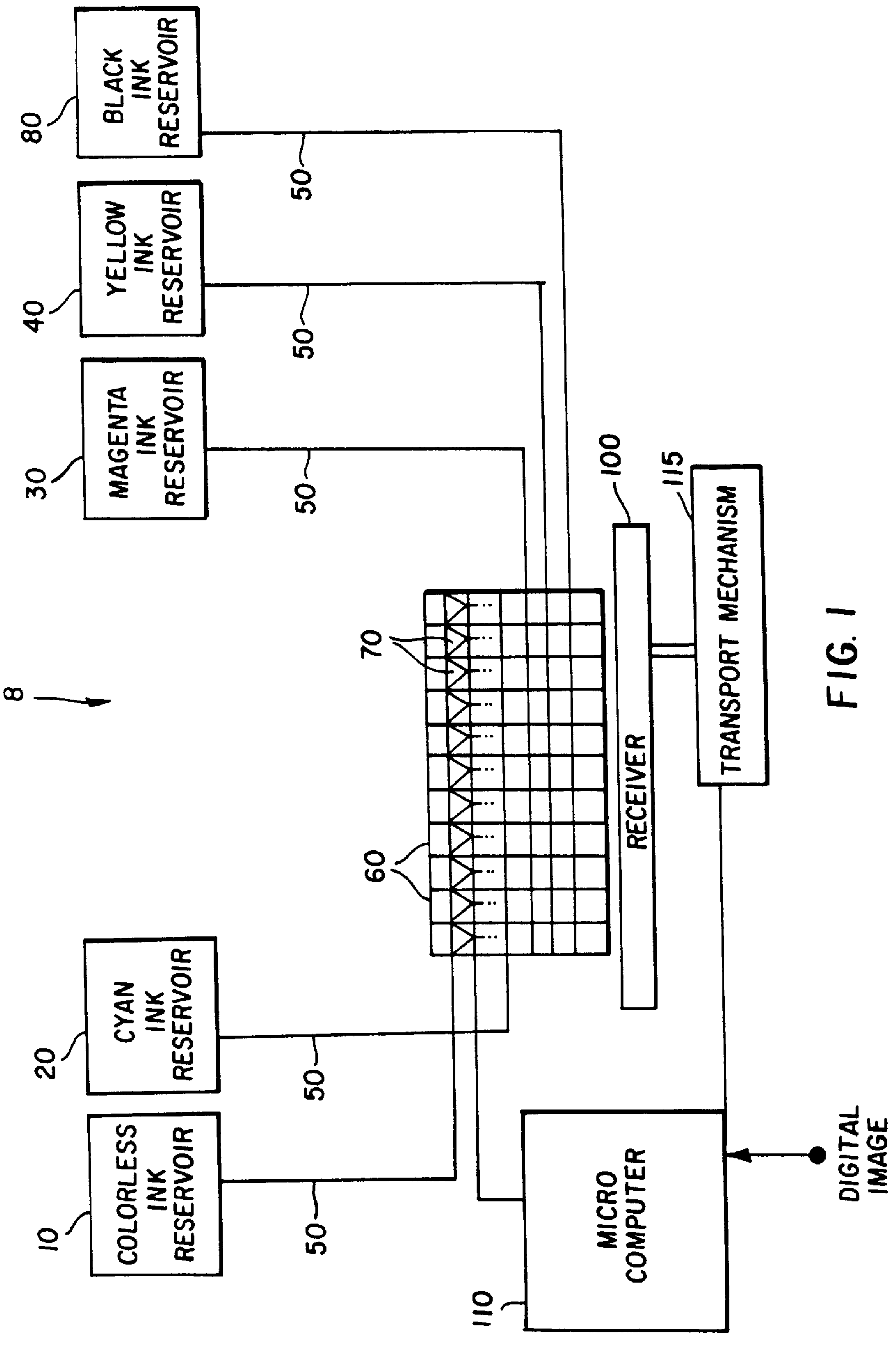
FIG. 1 is a partial schematic view showing an apparatus for pumping, mixing and printing pixels of ink onto a reflective receiver.

Referring to FIG. 1, a schematic diagram is shown of a printing apparatus 8 in accordance with the present invention. Reservoirs 10, 20, 30, and 40 are respectively provided for holding colorless ink, cyan ink, magenta ink, and yellow ink. An optional reservoir 80 is shown for black ink. Microchannel capillaries 50 respectively connected to each of the reservoirs conduct ink from the corresponding reservoir to an array of ink mixing chambers 60. In the present invention, the ink mixing chambers 60 delivery the inks directly to a receiver; however, other types of ink delivery arrangements can be used such as microfluidic channels, and so when the word chamber is used, it will be understood to include those arrangements. The colored inks are delivered to ink mixing chambers 60 by microfluidic pumps 70. The amount of each color ink is controlled by microcomputer 110 according to the input digital image. For clarity of illustration, only one set of microfluidic pumps is shown for the colorless ink channel. Similar pumps are used for the other color channels, but these are omitted from the figure for clarity. Finally, a reflective receiver 100 is transported by a transport mechanism 115 to come in contact with the microfluidic printing apparatus. The receiver 100 receives the ink and thereby produces the print. Receivers may include common bond paper, made from wood fibers, as well as synthetic papers made from polymeric fibers. In addition receiver can be of non-fibrous construction, provided they absorb and hold the ink used in the printer.

Figure 2:
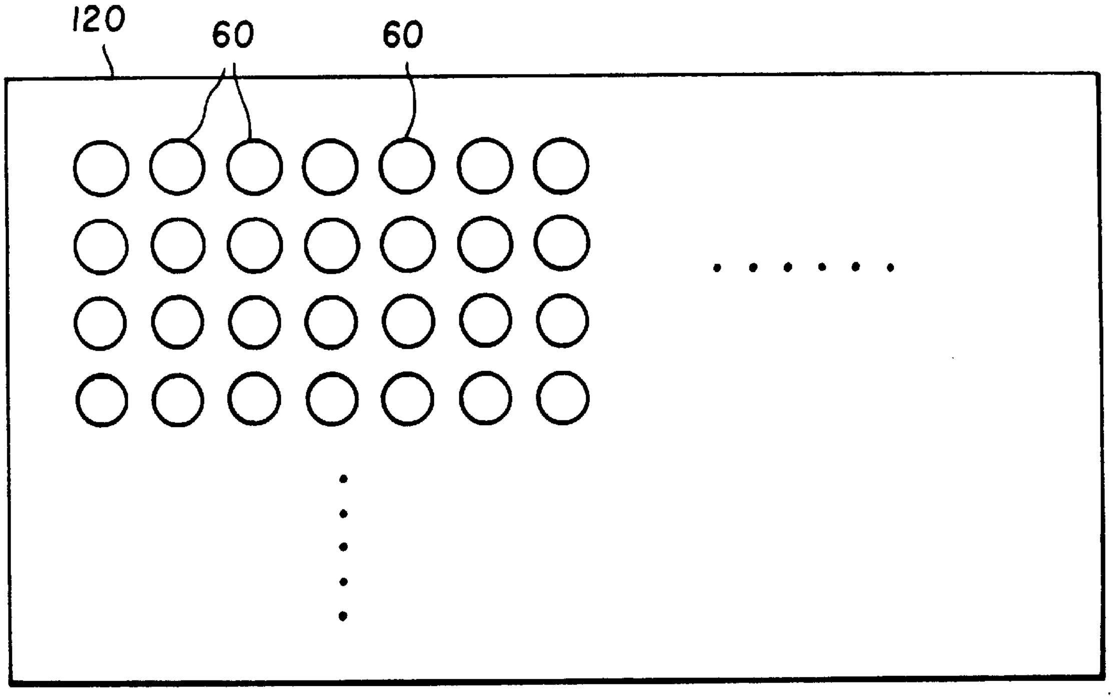
FIG. 2 is a top view of the pattern of the color pixels described in the present invention.

FIG. 2 depicts a top view of an arrangement of mixing chambers 60 shown in FIG. 1. Each ink mixing chamber 60 is capable of producing a mixed ink having any color saturation, hue and lightness within the color gamut provided by the set of cyan, magenta, yellow, and colorless inks used in the apparatus.

The inks used in this invention are dispersions of colorants in common solvents. Examples of such inks may be found is U.S. Pat. No. 5,611,847 by Gustina, Santilli and Bugner. Inks may also be found in the following commonly assigned U.S. patent application Ser. No. 08/699,955 filed Aug. 20, 1996; Ser. No. 08/699,962 filed Aug. 20, 1996; and Ser. No. 08/699,963 filed Aug. 20, 1996 by McInerney, Oldfield, Bugner, Bermel and Santilli; and in U.S. patent application Ser. No. 08/790,131 filed Jan. 29, 1997 by Bishop, Simons and Brick; and in U.S. patent application Ser. No. 08/764,379 filed Dec. 13, 1996 by Martin. In a preferred embodiment of the invention the solvent is water. Colorants such as the Ciba Geigy Unisperse Rubine 4BA-PA, Unisperse Yellow RT-PA, and Unisperse Blue GT-PA are also preferred embodiments of the invention. The colorless ink of this invention is the solvent for the colored inks in the most preferred embodiment of the invention.

The microchannel capillaries, ink pixel mixing chambers and microfluidic pumps are more fully described in the references listed above.

Figure 3:
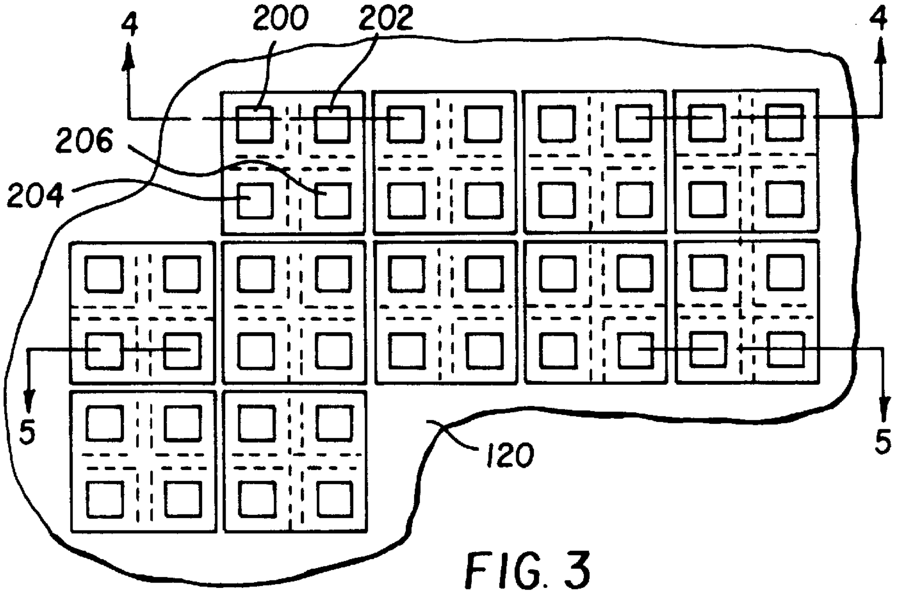
FIG. 3 is a top view of a second pattern of the color pixels described in the present invention.

FIG. 3 illustrates the arrangement of a second pattern of color pixels in the present invention. The ink mixing chambers 60 are divided into four groups cyan ink orifice 200; magenta ink orifice 202; yellow ink orifice 204; and black ink orifice 206. Each chamber is connected only to the respective colored ink reservoir and to the colorless ink reservoir 10. For example, the cyan ink orifice 200 is connected to the cyan ink reservoir and the colorless ink reservoir so that cyan inks can be mixed to any desired lightness. When the inks are transferred to the reflective receiver 100 some of the inks can mix and blend on the receiver. Inasmuch as the inks are in distinct areas on the receiver, the size of the printed pixels should be selected to be small enough so that the human eye will integrate the color and the appearance of the image will be that of a continuous tone photographic quality image.

Figure 4:
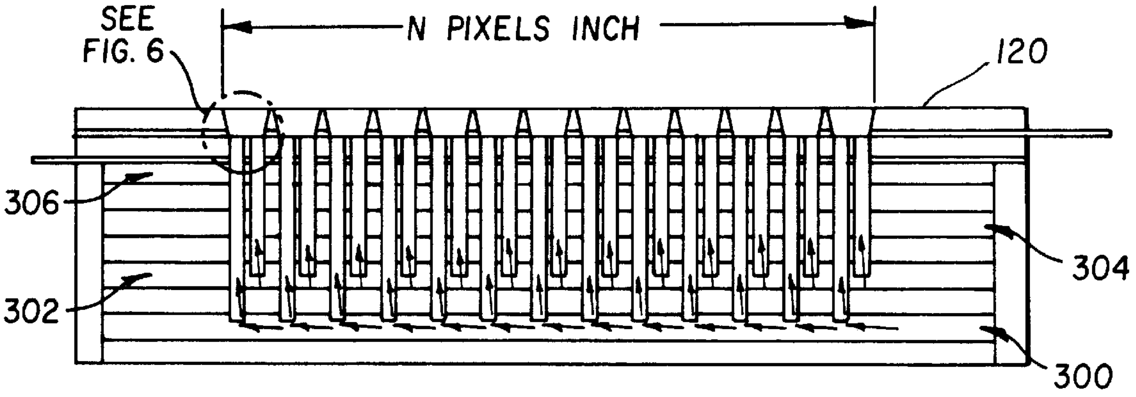
FIG. 4 is a cross-sectional view taken along the lines 4—4 of the microfluidic printing apparatus in FIG. 3.
Figure 5:
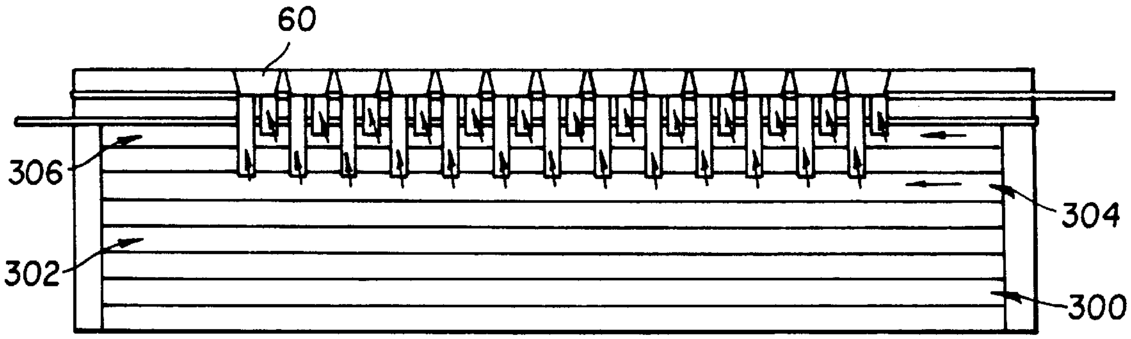
FIG. 5 is another cross-sectional view taken along the lines 5—5 of the microfluidic printing apparatus in FIG. 3.

Cross-sections of the color pixel arrangement shown in FIG. 3 are illustrated in FIG. 4 and FIG. 5. The colored ink supplies 300, 302, 304, and 306 are fabricated in channels parallel to the printer front plate 120. The cyan, magenta, yellow and black inks are respectively delivered by colored ink supplies 300, 302, 304, and 306 into each of the colored ink mixing chambers.

Figure 6:
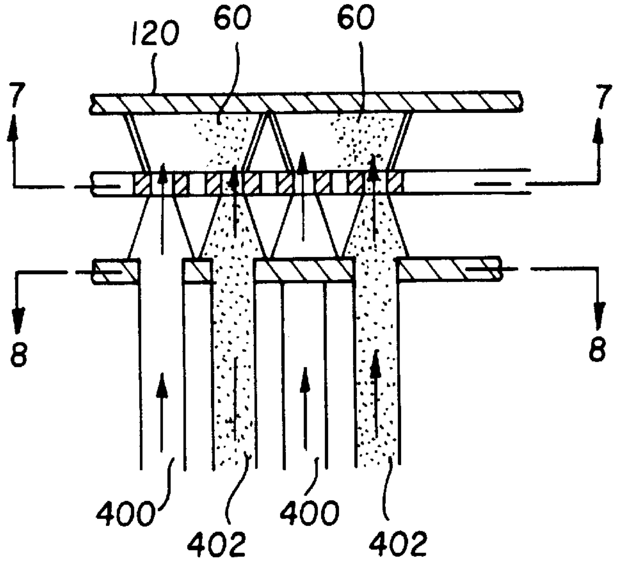
FIG. 6 is an enlarged view of the circled portion of FIG. 4.
Figure 8:
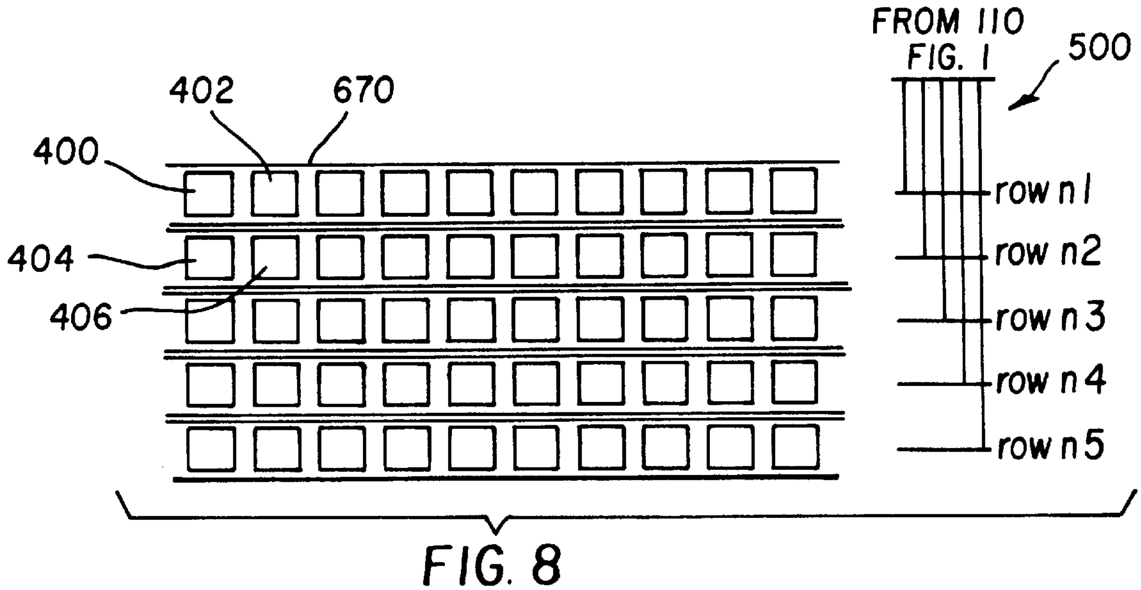
FIG. 8 is a top view of the microchannel and showing conducting circuit connections in FIG. 6.

A detailed view of the cross-section in FIG. 4 is illustrated in FIG. 6. The colored inks are delivered to the ink mixing chambers respectively by cyan, magenta, yellow, and black ink microchannels 400, 402, 404, and 406. Microchannels 404 and 406 are not shown in FIG. 6, but are illustrated in FIG. 8. The colored ink microchannels 400, 402, 404, and 406 are respectively connected to the colored ink supplies 300, 302, 304, and 306 (FIGS. 4 and 5). The colorless ink is supplied to the ink mixing chamber, but is not shown in FIG. 6 for clarity of illustration.

Figure 7:
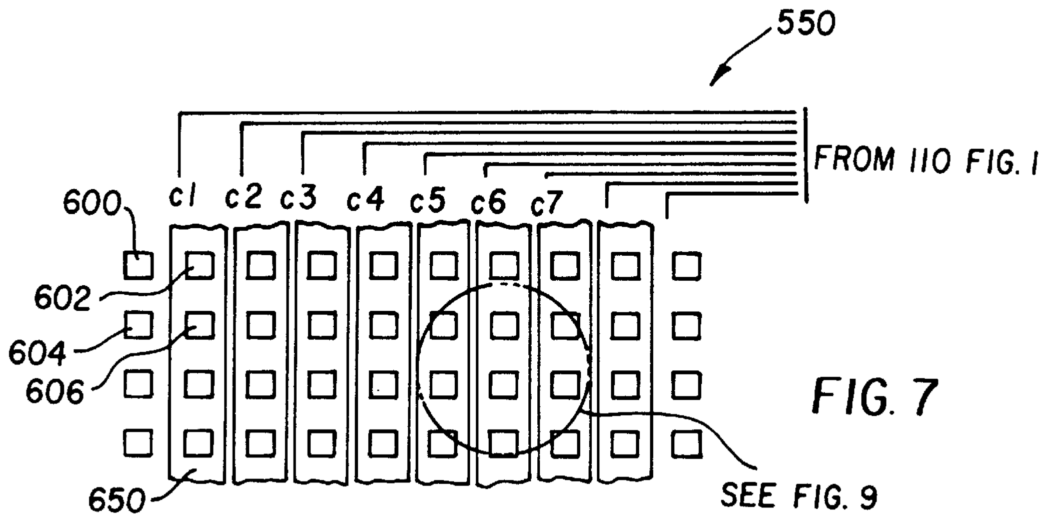
FIG. 7 is a top view of the micronozzles shown in FIG. 6.

A cross-section view of the plane containing the micronozzles in FIG. 6 is shown in FIG. 7. The cyan, magenta, yellow, and black ink micronozzles 600, 602, 604, and 606 are distributed in the same arrangement as the colored ink micro channels 300–304 and the colored ink mixing chambers 200–206. The column electrodes 650 are shown connected to the conducting circuit 550, which is further connected to microcomputer 110.

A cross-section view of the plane containing the microchannels in FIG. 6 is shown in FIG. 8. The color ink channels 400–406 are laid out in the spatial arrangement that corresponds to those in FIGS. 3 and 7. The lower electrodes in the microfluidic pumps for delivering the colored inks are not shown for clarity of illustration. The row electrodes 670 are connected to lower electrodes of the microfluidic pumps. The row electrodes 670 are shown connected to the conducting circuit 500, which is further connected to microcomputer 110.

FIGS. 9A, 9B, 9C, and 9D are diagrams of an embodiment of this invention shown in different orientations. High quality reproduction of digital images requires uniform printing performance across the printer front plate 120. There should be minimal variation in the pumping efficiencies of the microfluidic pumps (not shown) which deliver the ink to the colorant delivery chambers 60 in the printer front plate 120. An important factor that effects the pumping efficiency of an microfluidic pump is the hydrostatic pressure and forces acting on the colorant fluid in the microfluidic pump. The variability of hydrostatic pressure or acceleration forces caused by the moving printer need therefore to be properly controlled.

The operation of the microfluidic printer 8 includes the steps of activating the microfluidic pumps 70 to pump the correct amount of each color ink to the mixing chambers 60 to provide a pixel of the correct hue and intensity corresponding to the pixel of the scene being printed. A receiver 100 is then contacted to the ink mixing chambers 60 and capillary or absorption forces draw the ink from the mixing chambers to the receiver 100. The receiver is then removed from contact with the mixing chambers and allowed to dry. Timing of the removal of the receiver is critical to prevent excess ink to be drawn from the microchannels 400, 402, 404, and 406 that feed the ink mixing chambers 60.

Figure 9A:
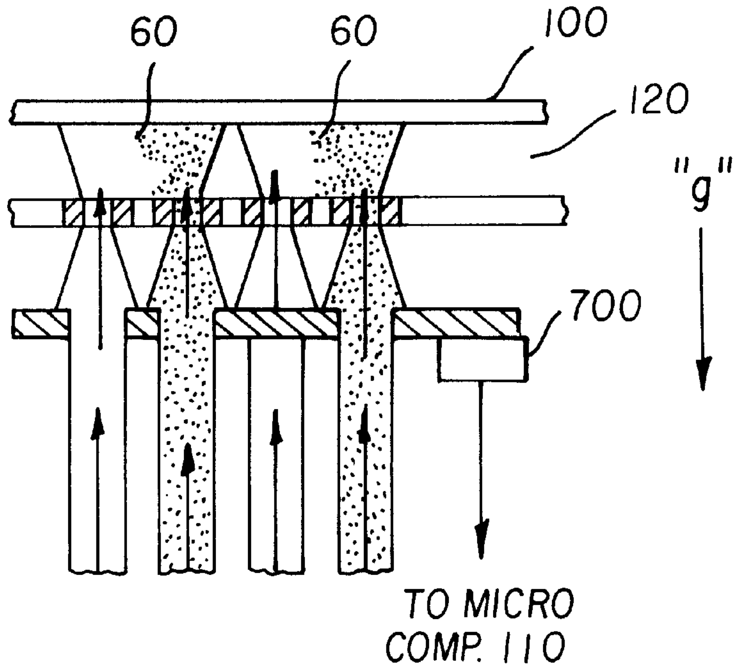
FIGS. 9A, 9B, 9C, and 9D are schematic diagrams of an embodiment of this invention shown in different operating orientations.
Figure 9B:
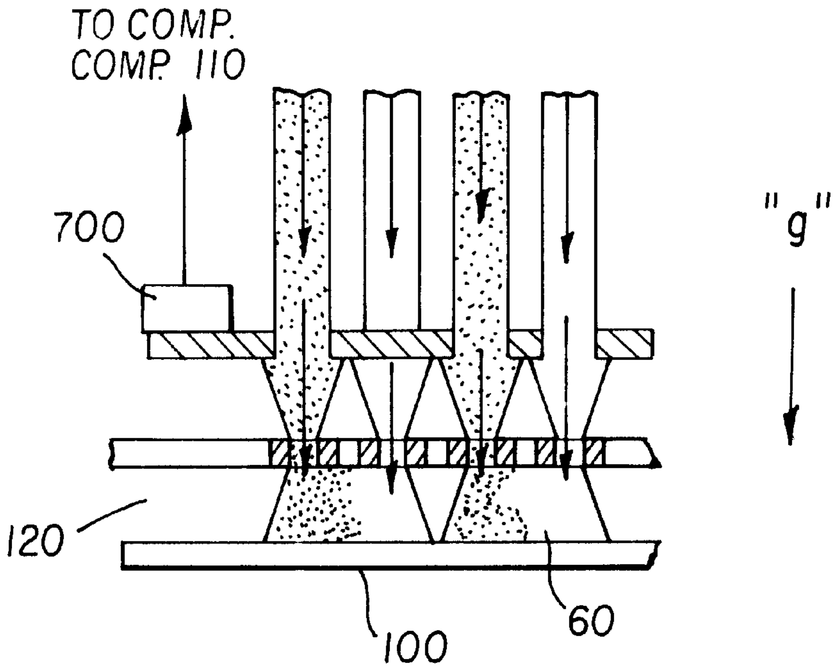
Figure 9C:
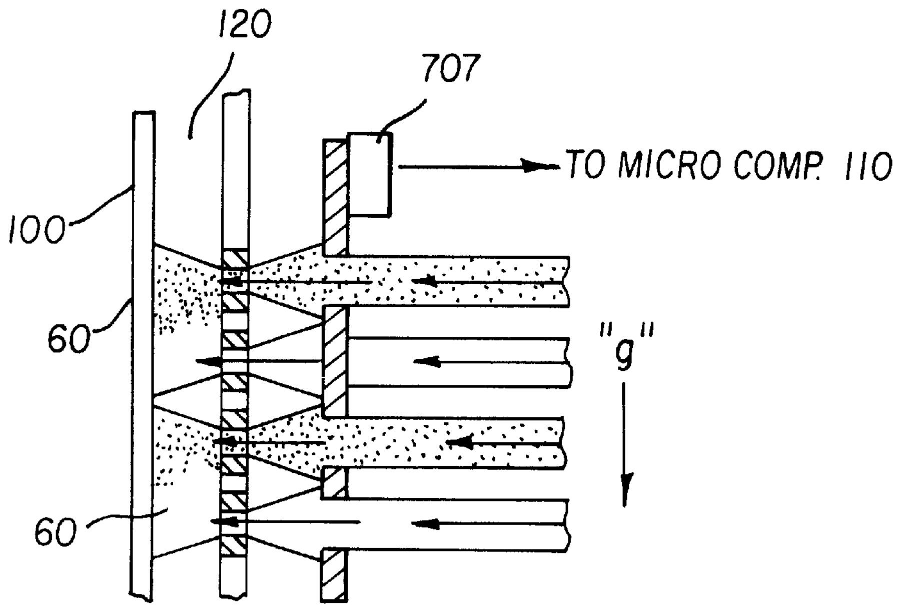
Figure 9D:
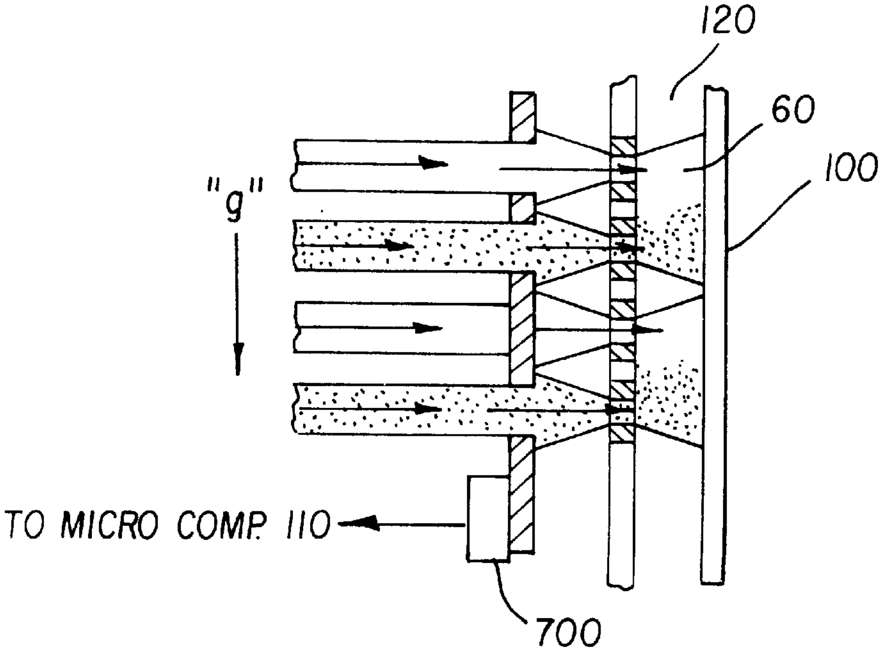

The microfluidic printer 8 is shown in horizontal (which refers to the position of the printer face 120 being horizontally orientated with the printer face 120 being in the top position) (FIG. 9A). In FIG. 9B, the printer face 120 is also horizontal but it is in the bottom position. In FIG. 9C, the printer face 120 is in a vertical orientation facing to the left, whereas in FIG. 9D, the printer face 120 is also vertically orientated but faces to the right. In all these views, the force of gravity is shown by the arrow labeled "g". A preferred orientation for the microfluidic printer 8 is that shown in FIG. 9B and having an "upside-down" orientation in which the front plate 120 is level and facing down. In this orientation, the hydrostatic pressure due to the gravitation force is uniform across the printer front plate 120. The pump efficiencies are essentially uniform if the microfluidic printer 8 is not subject to acceleration movement during printing. When the orientation is different from the level "upside-down" direction or when there is acceleration during printing, the variability in the pumping efficiencies need to be compensated, or in extreme situations, the printing operation needs to be terminated.

In FIGS. 9A–D, a sensor 700 detects orientation and the acceleration in the microfluidic printer 8. The detected orientation and acceleration are communicated to the microcomputer 110. The microcomputer 110 then controls the microfluidic pumps 70 to compensate for the variations in the hydrostatic pressure caused by the differences in the gravitational potential and by the accelerations of microfluidic printer 8. The sensor 700 can, for example, be a ball on an electrically sensitive membrane may be used, or a weight arm on a potentiometer. When the sensor 700 produces a signal which indicates that the orientation or acceleration are too excessive, or outside the range of compensation, the microcomputer 110 communicates a signal which causes the microfluidic pumps 70 to stop the printing operation until the conditions are again within the acceptable printable range.

The operation for the different orientations of the printer will now be discussed. In FIG. 9A, colored inks are delivered vertically upwardly to the ink mixing chambers 60 and are transferred to receiver sheet 100. In FIG. 9B, the colored inks are pumped downwardly to the ink mixing chambers 60.

The invention has been described in detail with particular reference to certain preferred embodiments thereof, but it will be understood that variations and modifications can be effected within the spirit and scope of the invention.

PARTS LIST

8 microfluidic printer
10 colorless ink reservoir
20 cyan ink reservoir
30 magenta ink reservoir
40 yellow ink reservoir
50 microchannel capillaries
60 ink mixing chambers, or printing nozzles
70 microfluidic pumps
80 black ink reservoir
100 receiver
110 microcomputer
115 transport mechanism
120 printer front plate
200 cyan ink orifice
202 magenta ink orifice
204 yellow ink orifice
206 black ink orifice
300 cyan ink supply
302 magenta ink supply
304 yellow ink supply
306 black ink supply
400 cyan ink microchannel
402 magenta ink microchannel
404 yellow ink microchannel
406 black ink microchannel
500 conducting circuit
550 conducting circuit
600 cyan ink micro-orifice
602 magenta ink micro-orifice
604 yellow ink micro-orifice
606 black ink micro-orifice
650 column electrodes
670 row electrodes
700 sensor

What is claimed is:

1. A microfluidic printing apparatus comprising:

a) at least one ink reservoir;

b) a structure defining a plurality of chambers arranged so that the chambers form an array with each chamber of said plurality of chambers being arranged to form an ink pixel;

c) a plurality of microchannels connecting said at least one ink reservoir to a chamber of said plurality of chambers;

d) a plurality of microfluidic pumps each being associated with a single microchannel of said plurality of microchannels for supplying ink from said at least one ink reservoir through a microchannel of said plurality of microchannels for delivery to a particular chamber of said plurality of chambers;

e) means for providing an electrical signal representing an orientation of the printing apparatus; and f) control means responsive to the electrical signal and for controlling the microfluidic pumps to compensate for changes in the orientation of the printing apparatus for causing an array of pixels to be printed when the microfluidic pumps supply said ink through the microchannels to the chambers so that a correct amount of ink is delivered into each chamber of said plurality of chambers.

2. The printing apparatus of claim 1 wherein the electrical signal indicates that the orientation of the printing apparatus is in an unsuitable printing position, the control means prevents the microfluidic pumps from supplying said ink to said plurality of chambers.

3. The printing apparatus of claim 1 wherein the control means includes a sensor for producing the electrical signal which indicates that the orientation of the printing apparatus is out of a printable range for preventing the microfluidic pumps from supplying said ink to said plurality of chambers.

* * * * *